US007625542B2

(12) United States Patent
Zhang et al.

(10) Patent No.: US 7,625,542 B2
(45) Date of Patent: Dec. 1, 2009

(54) METHOD FOR THE PRODUCTION OF METAL CARBIDES

(75) Inventors: Zongtao Zhang, Unionville, CT (US); Meidong Wang, Willington, CT (US); Danny Xiao, Willington, CT (US)

(73) Assignee: Inframat Corporation, Farmington, CT (US)

( * ) Notice: Subject to any disclaimer, the term of this patent is extended or adjusted under 35 U.S.C. 154(b) by 805 days.

(21) Appl. No.: 10/831,047

(22) Filed: Apr. 23, 2004

(65) Prior Publication Data

US 2004/0265208 A1 Dec. 30, 2004

Related U.S. Application Data

(60) Provisional application No. 60/465,829, filed on Apr. 25, 2003.

(51) Int. Cl.
- *C01B 31/34* (2006.01)
- *C01B 31/30* (2006.01)
- *C01G 37/00* (2006.01)
- *C01G 39/00* (2006.01)
- *C01G 41/00* (2006.01)
- *C22B 34/30* (2006.01)

(52) U.S. Cl. ............... 423/440; 423/439; 423/53
(58) Field of Classification Search .......... 423/440, 423/439, 53
See application file for complete search history.

(56) References Cited

U.S. PATENT DOCUMENTS

| | | | |
|---|---|---|---|
| 1,874,641 A | 8/1932 | Sessions | |
| 1,876,175 A | 9/1932 | Stoody et al. | |
| 2,285,837 A | 6/1942 | Ridgway | |
| 2,601,023 A | 6/1952 | Hurd | |
| 2,869,990 A | 1/1959 | Burgess | |
| 3,077,385 A | 2/1963 | Robb | |
| 3,106,455 A | 10/1963 | Ripley | |
| 3,205,042 A | 9/1965 | Jacobson | |
| 3,297,810 A | 1/1967 | Lubatti | |
| 3,377,141 A * | 4/1968 | Hardy et al. | ............ 423/252 |
| 3,379,647 A | 4/1968 | Smudski | |
| 3,395,030 A | 7/1968 | Dittrich | |
| 3,403,008 A | 9/1968 | Hamling | |
| 3,428,717 A | 2/1969 | Accary et al. | |
| 3,438,729 A | 4/1969 | Ohlgren | |
| 3,529,988 A | 9/1970 | Worener | |
| 3,802,847 A | 4/1974 | Hara et al. | |
| 3,839,542 A | 10/1974 | Chase | |
| 3,902,917 A | 9/1975 | Baresel et al. | |
| 3,932,594 A | 1/1976 | Gortsema | |

(Continued)

OTHER PUBLICATIONS

Koc, Rasit et al. "Tungsten carbide (WC) synthesis from novel precursors." 2000: Journal of the European Ceramic Society. 20. 1859-1869.*

*Primary Examiner*—Steven Bos
*Assistant Examiner*—Anthony J Zimmer
(74) *Attorney, Agent, or Firm*—Cantor Colburn LLP

(57) ABSTRACT

Methods for the production of monometal carbides are disclosed. A metal source and a carbon source are reacted under conditions suitable to produce a reaction product. The reaction product may comprise fully carburized monometal carbide and excess carbon, or an intermediate product comprising partially carburized monometal carbide in the presence or absence of excess carbon. The carbon content in the reaction product may then be adjusted in a controlled removal or addition process to produce a product the fully carburized monometal carbide having near stoichiometric carbon.

19 Claims, 1 Drawing Sheet

U.S. PATENT DOCUMENTS

| | | | |
|---|---|---|---|
| 3,976,749 A | 8/1976 | Wedemeyer | |
| 4,008,090 A * | 2/1977 | Miyake et al. | 501/91 |
| 4,049,380 A | 9/1977 | Yih et al. | |
| 4,066,451 A | 1/1978 | Rudy | |
| 4,115,526 A | 9/1978 | Auborn et al. | |
| 4,172,808 A | 10/1979 | Bohm et al. | |
| 4,190,439 A * | 2/1980 | Gortsema | 419/30 |
| 4,402,737 A * | 9/1983 | Kronenwetter et al. | 419/18 |
| 4,478,611 A * | 10/1984 | Selden | 51/307 |
| 4,515,763 A | 5/1985 | Boudart et al. | |
| 4,664,899 A * | 5/1987 | Kimmel et al. | 423/440 |
| 4,752,456 A | 6/1988 | Yoda et al. | |
| 4,826,666 A | 5/1989 | Laine | |
| 4,851,206 A | 7/1989 | Boudart et al. | |
| 4,872,904 A * | 10/1989 | Dorfman | 75/352 |
| 4,921,531 A | 5/1990 | Nagle et al. | |
| 4,948,762 A | 8/1990 | Krumbe et al. | |
| 4,983,354 A * | 1/1991 | Reeder et al. | 419/11 |
| 5,017,525 A | 5/1991 | Birchall et al. | |
| 5,045,121 A | 9/1991 | Hoffman et al. | |
| 5,061,661 A | 10/1991 | Moyle et al. | |
| 5,071,473 A * | 12/1991 | Reeder et al. | 75/240 |
| 5,166,103 A | 11/1992 | Krstic | |
| 5,169,808 A | 12/1992 | Gallo et al. | |
| 5,230,729 A * | 7/1993 | McCandlish et al. | 75/351 |
| 5,338,523 A | 8/1994 | Krstic | |
| 5,352,269 A | 10/1994 | McCandlish et al. | |
| 5,370,854 A | 12/1994 | Henley et al. | |
| 5,372,269 A | 12/1994 | Sutton et al. | |
| 5,372,797 A | 12/1994 | Dunmead et al. | |
| 5,380,688 A | 1/1995 | Dunmead et al. | |
| 5,567,662 A | 10/1996 | Dunmead et al. | |
| 5,612,264 A * | 3/1997 | Nilsson et al. | 501/87 |
| 5,776,264 A | 7/1998 | McCandlish et al. | |
| 5,869,019 A | 2/1999 | Seegopaul | |
| 6,214,309 B1 | 4/2001 | Shaw et al. | |
| 6,398,125 B1 | 6/2002 | Liu et al. | |
| 2002/0009411 A1 | 1/2002 | Zucker et al. | |

* cited by examiner

METHOD FOR THE PRODUCTION OF METAL CARBIDES

CROSS-REFERENCE TO RELATED APPLICATION

This application claims priority to U.S. application Ser. No. 60/465,829, filed Apr. 25, 2003, which is incorporated herein by reference in its entirety.

BACKGROUND

Metal carbides, such as tungsten carbide (WC), are an important group of materials that are used in many commercial applications. For some applications, tungsten carbide should have a low level of free carbon and a uniform particle size. Tungsten carbide is useful for making articles which require substantial mechanical strength, such as, for example, dies, cutting tools, and drilling tools.

Synthesis methods for WC may generally be divided into two categories, carbothermal reaction and direct carburization. A carbothermal reaction was first disclosed in the 1930's to the 1940's, in, for example, U.S. Pat. No. 2,285,837. In this method, incomplete reaction results in a mixture of products such as tungsten (W), ditungsten carbide ($W_2C$), and WC. Factors such as the quality of the raw materials, the reactor parameters, and the reaction parameters led to batch to batch variations in the final carbon content of the WC product.

The second method for formation of tungsten carbide is the direct carburization method as described in U.S. Pat. No. 1,876,175. The reaction is simple and the carbon content can be controlled to the stoichiometric level of 6.13 wt %. The direct carburization method has been the standard tungsten carbide powder production method since the 1950s. A drawback of the direct carburization method, however, is that high temperature reaction (e.g., greater than or equal to about 1400° C.) is required, resulting in grain sizes of greater than about 1.0 µm.

In 1980's to the 1990's, two-step processes were utilized to make WC with finer particle sizes, typically 10 nm to 120 nm. One such method was disclosed in U.S. application Ser. No. 20020009411 to Zucker. In the method, tungsten carbide was synthesized from a tungsten precursor compound by heating the precursor compound to a first temperature of at least about 450° C. in a reducing gas composition to form an intermediate tungsten product, and carburizing the intermediate tungsten product in the reactor by heating to a second temperature of at least about 750° C. under a carburizing gas composition comprising at least a first hydrocarbon species to form a tungsten carbide product comprising at least about 98 percent by weight WC. Similar methods were disclosed in U.S. Pat. Nos. 5,372,797 and 5,370,854, and CN 97 1 06622.1.

Another method for making tungsten carbide was described in U.S. Pat. No. 5,567,662. The first step in the method was a partial carburization process to form a mixture of WC, $W_2C$, and W at a low temperature of 1000° C. to 1120° C.; while the second step was adding carbon black to the mixture of $W_2C$ and W and converting to WC at a high temperature of 1200° C. to 1300° C. A drawback of this process was that the high temperature reaction of the second step resulted in partial sintering of the WC. In addition, a post grinding process was required to get final product with a particle size of 0.1 µm to 0.2 µm. Similar methods were disclosed in U.S. Pat. Nos. 5,380,688; 5,166,103; 4,664,899; and 4,008,090; and in the article, "The Direct Production of WC from $WO_3$ by Using Two Rotary Carburizing Furnaces", Journal of Japan Society of Powder and Powder Metallurgy, Volume 26, No. 3, pages 90+, by M. Miyake, et al.

The two-step carbothermal reaction has an advantage in the precise control of the WC composition. However, many of the previous two-step processes had a first step of partial carburization to form a mixture of W, $W_2C$, and WC at low temperature, followed by a second step of adding carbon to the partially carburized mixture to form WC at high temperature. Disadvantages of these methods include the slow carburization process, high temperature reaction which leads to grain growth, and safety issues resulting from the use of tungsten powder.

Accordingly, there is a need for improved methods of making tungsten carbide, particularly superfine tungsten carbide.

SUMMARY

A method of making a tungsten carbide powder comprises heating a reaction mixture comprising a tungsten source and a solid carbon source at a first temperature of about 900° C. to about 1200° C. in a non-reducing atmosphere to form a reaction product comprising fully carburized tungsten carbide and an excess of free solid carbon; wherein the reaction product has a total carbon content of greater than 6.13 wt %; and removing the excess carbon from the reaction product using a controlled removal process to form a tungsten carbide powder having a carbon content of 6.08 wt % to 6.16 wt %; wherein a molar ratio of carbon to tungsten in the reaction mixture is greater than or equal to about 3.45.

Another method of making a tungsten carbide powder comprises heating a reaction mixture comprising a tungsten source and a solid carbon source at a first temperature of about 900° C. to about 1200° C. in a non-reducing atmosphere to form a reaction product comprising fully carburized tungsten carbide and an excess of free solid carbon; wherein a molar ratio of carbon to tungsten in the reaction mixture is greater than or equal to about 3.45; and wherein the reaction product has a total carbon content of greater than 6.13 wt %; and removing the excess carbon from the reaction product using a controlled chemical removal process to form a tungsten carbide powder having a carbon content of 6.08 wt % to 6.16 wt %, wherein the controlled chemical removal process comprises heating the reaction product at a temperature of about 800° C. to about 1200° C. in a gas mixture having a carbon activity of about 0.01 to 0.99, wherein the gas mixture comprises hydrogen and methane.

Yet another method of making a tungsten carbide powder comprises heating a reaction mixture comprising a solid tungsten source and a solid carbon source in a non-reducing atmosphere at a first temperature sufficient to form an intermediate product comprising a partially carburized tungsten carbide and free solid carbon, wherein the intermediate product has a carbon content of greater than 6.13 wt %; and adjusting the carbon content of the partially carburized tungsten carbide to form a fully carburized tungsten carbide powder having a carbon content of 6.08 wt % to 6.16 wt %; wherein adjusting comprises heating at a second temperature in the presence of a gas mixture having a carbon activity of about 0.01 to 0.99 at a temperature of about 600° C. to about 1200° C.

Another method of making a tungsten carbide powder comprises heating a reaction mixture comprising a solid tungsten source and a solid carbon source in a non-reducing atmosphere at a first temperature sufficient to form an intermediate product comprising a partially carburized tungsten carbide, wherein the intermediate product has a carbon content of less than 6.13 wt %; and adjusting the carbon content of the partially carburized tungsten carbide to form a fully carburized tungsten carbide powder having a carbon content of 6.08 wt % to 6.16 wt %; wherein adjusting comprises heating at a second temperature in the presence of a gas mixture having a carbon activity of about 0.5 to about 0.99.

DETAILED DESCRIPTION

Figure 1:
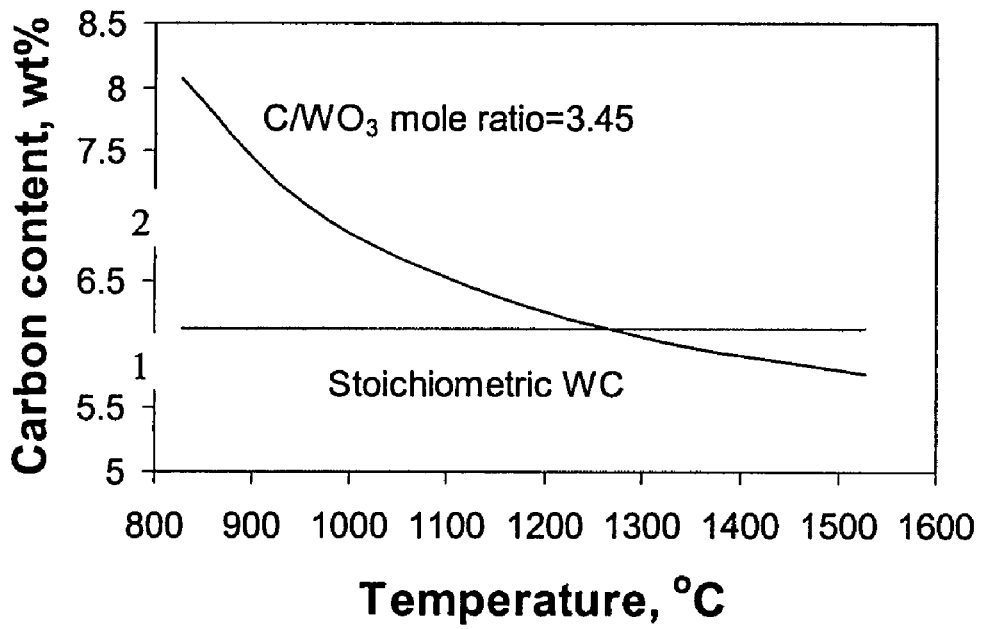
FIG. 1 is a graphical representation of the relationship between carbon content in tungsten carbide and the carbon to tungsten mole ratio in the starting materials at different reaction temperatures.

The terms "a" and "an" herein do not denote a limitation of quantity, but rather denote the presence of at least one of the referenced item. As used herein the term "wt %" means weight percent or percent by weight.

Methods are described to produce metal carbide powders with controlled morphology and chemical composition. The metal carbide powders may be nanometer particle size powders having dimensions of 1 nm to 100 nm, or superfine powders having particle size of 100 nm to about 1 micrometer. In one embodiment, the method comprises heating a mixture comprising a metal source and a solid carbon source to a first temperature sufficient to produce a reaction product comprising fully carburized monometal carbide and excess carbon; and subsequently removing the excess carbon in a controlled removal process. In this embodiment, the reaction product is actually a mixture of the final monometal carbide (e.g., WC) and excess carbon. In one embodiment, the reaction product consists essentially of a monometal carbide and excess carbon. In other words, metal and dimetal carbide cannot be detected in the reaction product by x-ray diffraction. The heating is performed in a non-reducing atmosphere and may be performed at a total pressure of greater than or equal to about one atmosphere for a sufficient time to form an intermediate product consisting essentially of fully carburized monometal and free carbon. In this embodiment, the carbon source is employed in an amount that is greater than the stoichiometric amount needed to produce the monometal carbide at the thermodynamic reaction temperatures. When the metal is tungsten, heating may be done at a temperature of about 900° C. to about 1200° C. and a molar ratio of carbon to tungsten (e.g., C/W=n) of greater than or equal to about 3.45. The carbon to tungsten ratio of greater than or equal to about 3.45 is based on the calculation of thermodynamics in reaction (1) at a temperature of greater than 900° C. If the reaction temperature is higher than 1100° C., then the carbon to tungsten ratio is greater than or equal to about 4.0 since the by-products of primarily CO and $CO_2$ can be ignored. Thus, in one embodiment, the molar ratio of carbon to tungsten in the reaction mixture is greater than or equal to about 4.0. The excess carbon in the intermediate product can then be removed by controlling the carbon activity in the controlled removal process to about 0.01 to 0.99, or about 0.01 to about 0.5 at a temperature of about 600° C. to about 1200° C., or about 800° C. to about 1200° C. The fully carburized tungsten carbide product formed has a carbon content of about 6.08 wt % to about 6.16 wt %.

In another embodiment, a method of forming a tungsten carbide powder comprises heating a reaction mixture comprising a solid tungsten source and a solid carbon source in a non-reducing atmosphere at a sufficient temperature to form an intermediate product comprising a partially carburized tungsten carbide and free carbon with a total carbon content of greater than 6.13 wt %, i.e., an intermediate product containing WC, W, and $W_2C$ and C. Heating may be done with a carbon to tungsten molar ratio of greater than or equal to about 3.45 at a temperature of about 900° C. to about 1200° C. This intermediate product may be formed, for example, when the molar ratio of carbon to tungsten is greater than or equal to about 3.45, but the reaction time is not sufficient to produce fully carburized tungsten carbide. The carbon content of the partially carburized tungsten carbide powder and free carbon mixture may be adjusted to form a fully carburized tungsten carbide powder having a carbon content of about 6.08 wt % to about 6.16 wt %. Adjusting may comprise heating at a second temperature in the presence of a gas mixture having a carbon activity of 0.01 to 0.99, or 0.01 to 0.5, wherein the second temperature is about 600° C. to about 800° C. or about 800° C. to about 1200° C.

Another method of making a tungsten carbide powder comprises heating a reaction mixture comprising a solid tungsten source and a solid carbon source in a non-reducing atmosphere at a first temperature sufficient to form an intermediate product comprising a partially carburized tungsten carbide, wherein the intermediate product has a carbon content of less than 6.13 wt %. The first temperature may be about 900° C. to about 1200° C. The carbon content of the partially carburized tungsten carbide may be adjusted to form a fully carburized tungsten carbide powder having a carbon content of about 6.08 wt % to about 6.16 wt %. Adjusting may comprise heating at a second temperature in the presence of a gas mixture having a carbon activity of about 0.5 to about 0.99, wherein the second temperature is about 600° C. to about 800° C. or about 800° C. to about 1200° C.

The metal carbide formed is a monometal carbide. The metal carbide may be, for example, monotungsten carbide (WC). In the case of tungsten carbide, the stoichiometric amount of carbon in WC is 6.13 wt %. By fully carburized tungsten carbide, it is meant WC having a carbon content of about 6.08 wt % to about 6.16 wt %. By partially carburized tungsten carbide, it means a mixture of WC, W, and $W_2C$ having a carbon content of less than about 6.08 wt %; or a mixture of WC, W, $W_2C$ and C.

The metal source includes, for example, oxides of metals such as titanium, zirconium, hafnium, vanadium, niobium, tantalum, chromium, molybdenum, tungsten, and combinations comprising one or more of the foregoing metals. In one embodiment, the metal is tungsten, molybdenum, or chromium. In another embodiment, the metal is tungsten. Suitable tungsten sources include, for example, yellow tungsten oxide ($WO_3$) and blue tungsten oxide ($WO_{3-x}$, x<1). The tungsten source may also be a salt form of tungsten oxide such as ammonium metatungstate and/or ammonium paratungstate. Combinations of tungsten sources may also be employed. The particle size of the metal source may be about 1 µm to about 20 µm to give the desired nanosized or superfine final product, although other particle sizes may be employed.

Carbon sources include solid carbon sources. Unless otherwise noted, carbon source means a solid source, a gaseous carbon source, or a combination thereof. Solid carbon sources include finely divided forms of carbon, such as carbon black, lampblack, acetylene black and other form of particulate carbon including glucose, and combinations comprising one or more of the foregoing solid carbon sources. Suitable gaseous carbon sources include, for example, carbon monoxide, carbon dioxide, methane, propane, natural gas, and combinations comprising one or more of the foregoing gaseous carbon sources.

The amount of the metal source and the amount of the carbon source in the reaction mixture are determined based upon whether fully or partially carburized monometal carbide is the desired product. If fully carburized monometal carbide is to be produced, the reaction mixture should comprise excess carbon. The source of carbon is employed at a level which results in a total carbon content of more than the stoichiometric amount needed to produce the desired metal carbide. The method will be described for tungsten carbide, although it should be understood that the method may be used to produce other monometal carbides. For tungsten carbide, the total carbon should be 6.13 wt % in the fully-carburized WC (line 1, FIG. 1) and greater than 6.13 wt % in the mixture containing fully carburized WC and free C (the area above the stoichiometric WC line, FIG. 1). The source of carbon may be employed, for example, in an amount which is about 1 wt % to about 10 wt % greater than the stoichiometric amount of carbon needed to produce the desired tungsten carbide.

Without being held to theory, it is believed that formation of fully carburized WC in an excess of carbon occurs according to the following reactions. When calculating the level of carbon source needed to produce the desired tungsten carbide, it may be assumed that substantially all of the oxygen in the reaction mixture reacts with carbon and evolves as carbon monoxide and carbon dioxide at different temperatures according to reaction (1).

$$WO_3 + nC \rightarrow WC + (2n-5)CO + (4-n)CO_2 \quad (1)$$

$$C + 2H_2 \rightarrow CH_4 \quad (2)$$

wherein n is the carbon to tungsten mole ratio (C/W). The amount of the raw materials may be controlled to produce a product having a carbon content of greater than that required to produce stoichiometric tungsten carbide. In order to produce fully carburized WC and free carbon in the first step, the C to W mole ratio may be controlled according to the reaction temperature. The reaction temperature may be about 900° C. to about 1200° C. to produce nanostructured and/or superfine WC. The relationship between the temperature of the carburization reaction and the carbon content in the reaction is shown in FIG. 1, based on the thermodynamic calculation of reaction (1). At a temperature of 900° C., for example, the molar ratio of C to W should be greater than or equal to about 3.45 (line 2, FIG. 1). At a temperature of about 1100° C., the C to W mole ratio should be greater than or equal to about 4.0. The excess of free carbon may be removed according to reaction (2)

In another embodiment, the reaction (1) may not be complete, i.e., an intermediate product is formed comprising a partially carburized tungsten carbide product such as a mixture of W, $W_2C$, WC, and C due to the dynamic factors such as less reaction time, not enough heat, and mass transfer. In this embodiment, the total carbon content in the reaction mixture may still be more than 6.13 wt %. In this case, the carbon adjustment is believed to occur by a different reaction (3).

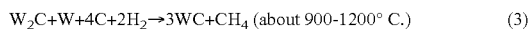

$$W_2C + W + 4C + 2H_2 \rightarrow 3WC + CH_4 \text{ (about 900-1200° C.)} \quad (3)$$

The carbon adjustment step (3) may then be employed to convert the $W_2C$ phase into WC. The adjustment may, for example, be performed in a gaseous environment of a carbon containing gas mixture. The carbon content of the intermediate product depends on the starting precursor composition, or carbon/metal oxide ratio in the agglomerated particles, for example.

In yet another embodiment, an intermediate product may be a partially carburized product comprising W, $W_2C$, and WC, wherein the total carbon content is less than 6.13 wt %. This situation may occur, for example, when the molar ratio of carbon to tungsten is less than 3.45. In this case, the carbon adjustment is believed to occur by a different reaction (4).

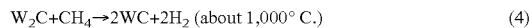

$$W_2C + CH_4 \rightarrow 2WC + 2H_2 \text{ (about 1,000° C.)} \quad (4)$$

The carbon adjustment step (4) may then be employed to convert the $W_2C$ phase into WC. The adjustment may for example, be performed in a gaseous environment of a carbon containing gas mixture.

In some embodiments, the reaction mixture comprises solid phase components. The solid metal source and solid carbon source may be mixed prior to reaction by a dry mixing process or a wet mixing process. This chemical reaction may be quite homogeneous since the mixing of the solid carbon source and solid metal source take place at the submicrometer level or the atomic level during mixing, such as in a ball milling process. The mixture of the metal source and the carbon source may be prepared by mixing one or more metal oxides with the carbon source using a suitable mixing technique, e.g., by ball milling or in a blender. The mixing is performed until a generally uniform blend is achieved. The reaction mixture may be formed, for example, by wet mixing by first forming a slurry comprising the metal source, the solid carbon source, and a liquid. Liquids useful in forming the slurry are those that are unreactive with the metal source and the carbon source under the conditions of, for example, ball milling and spray drying. Suitable liquids include, for example, water and ethanol.

After ball milling, the slurry may be spray dried to form agglomerated particles. The agglomerated particles may have a suitable shape such as, for example, spherical or spheroidal. During spray drying, the liquid is driven off and the agglomerated preceramic powder is formed, thus the temperature of the spray drying process should be higher than the vaporization temperature of the liquid, e.g., greater than 100° C. when water is the liquid.

In an alternate embodiment, molecular level mixing may be achieved by dissolving a soluble tungsten source (e.g., ammonium metatungstate) and a soluble carbon source (e.g., glucose) in water. This tungsten and carbon containing aqueous solution may be spray dried to form a uniform dry mixture of tungsten and carbon.

Heating of the reaction mixture is performed in a non-reducing atmosphere. The pressure may be greater than one atmosphere. In one embodiment, the pressure is just slightly above one atmosphere to decrease the occurrence of air leaking into the furnace. The non-reducing atmosphere may comprise, for example nitrogen, argon, or a combination comprising one or more of the foregoing gases. The atmosphere may be a flowing atmosphere to carry away gaseous by-products from the reaction, such as, carbon monoxide and carbon dioxide, which minimizes the required reaction time. Flowing atmospheres which exchange the atmosphere about 1 to about 100 times per minute, preferably about 10 to about 50 times per minute, may be employed.

A solid reaction mixture may be over-static, i.e., continuously overturned. The solid reaction mixture may be mixed in a bed which is overturned with a frequency so as to have substantially no or very little partial pressure, temperature, or composition gradients in the bed. The overturning may be achieved, for example, by placing the solid reactant mixture in a rotary furnace. The overturning may be achieved, for example, by placing the solid reactant mixture in a container having a longitudinal axis, positioning the container so that the longitudinal axis is at an acute angle relative to horizontal, and rotating the container along its longitudinal axis during heating. Such a container may be placed at an angle of about 0.5 degree to about 10 degree relative to horizontal and, preferably, about 1.0 degree to about 5.0 degree relative to horizontal.

The reaction mixture may be carburized under an inert atmosphere at a temperature of about 900° C. to about 1200° C. to form metal carbide particles. Carburization may be performed in a rotary furnace, although a push furnace, induction furnace, electrical furnace, fuel furnace, or moving bed furnace could be used. The rotary furnace may be a batch mode furnace or a continuous mode furnace. The heating may be performed at a first elevated temperature that is sufficient to cause full carburization of the metal in the reaction mixture. The first elevated temperature should be high enough such that the carburization reaction is thermodynamically favorable, i.e., the Gibbs free energy change for the reaction is negative. For the Gibbs free energy change to be negative, the free energy of formation of the reaction products must be less than the free energy of formation of the components of the reactant mixture.

For producing WC, for example, the first elevated temperature may be about 900° C. to about 1200° C. This temperature is significantly lower than the temperature of greater than 1400° C., which has been used in previous one-step methods. This reaction temperature is lower than the lowest temperature taught in, for example, U.S. Pat. No. 5,567,662. At a temperature of 900° C. to 1200° C., the WC grain growth may be limited and can be readily controlled to produce either nanometer sized WC (1 nm to 100 nm) or superfine sized WC (100 nm to 1 μm). Nanometer sized WC powders are formed at relatively low temperatures (900° C. to 1000° C.), while superfine sized WC powders are formed at somewhat higher temperatures (1000° C. to 1200° C.). When there is excess carbon in the reaction mixture, the free carbon can reduce amount of agglomeration in the metal carbide product. Reduced agglomeration can mean less energy is required than in other methods.

In one embodiment, heating of the solid reaction mixture is performed for a sufficient time to form fully carburized metal carbide. Heating may be performed until the reaction is essentially complete. For example, because there is free carbon in the mixture, the reaction product does not contain W and the partially carburized ditungsten carbide ($W_2C$). One method of monitoring when the reaction is complete is by monitoring the partial pressure of the carbon monoxide by-product. When the carbon monoxide level in the atmosphere reaches the level it was prior to the reaction, the reaction is considered to be complete. Another method of determining when the reaction is essentially complete is by monitoring the phase composition of the product by x-ray diffraction. When the pattern of the x-ray diffraction does not have $W_2C$ peaks, the reaction is complete.

The time required to form the fully carburized intermediate product may be less than one hour, and is a function of the temperature and the amount of the raw materials. For example, if the amount of the raw materials are 30 grams of $WO_3$ and C and the reaction is performed at 950° C., the reaction may be completed within about 20 minutes. For the same amount of raw materials, if the reaction is conducted at about 1000° C., the reaction may be complete within about 5 minutes. If the produced WC amount is 1000 grams using a 950° C. reaction temperature, the reaction time may be about 60 minutes. The reaction time is also dependent on the type of the bed in the furnace. If using a turning bed or fluidized bed reactor, the reaction may be much quicker than using a fixed bed reactor.

Once the reaction product or intermediate product has been formed, it may be cooled to room temperature and homogenized, e.g., by ball milling. In one embodiment, the reaction product comprises fully carburized nonmetal carbide and excess carbon. The fully carburized reaction product, for example, may then be analyzed for carbon content to determine the amount of carbon to remove from the intermediate product to make the desired tungsten carbide powder. Elemental carbon analysis using a combustion technique may be employed to determine the total carbon content.

When the reaction product comprises fully carburized tungsten carbide and excess carbon, the free carbon may be removed from the fully carburized metal carbide and free carbon mixture to form a stoichiometric metal carbide. Carbon removal is done using a controlled process. By a controlled process, it is meant the carbon is removed in a manner sufficient to produce the desired metal carbide stoichiometry.

One controlled removal process is a physical separation method. If the free carbon content is greater than or equal to 7 wt % in the reaction product, the physical separation method may be employed. An advantage of the physical method is low cost. Nearly 90% to 99% of the free carbon can be removed by this method. However, if more complete removal of the free carbon is desired, other methods may be more suitable. Physical separation methods includes gas separation, liquid separation, or combinations thereof. One physical method is air-classification utilizing the great density difference between WC and C, for example.

Another method to remove the free carbon from the reaction product is to employ a hydrogen-containing atmosphere at a second temperature which is sufficient to cause removal of the free carbon from the reaction product. The second temperature may be the same as or different than the first temperature. For producing nanometer sized tungsten carbide particles, the second temperature may be about 600° C. to about 1000° C. For producing sub-micrometer sized tungsten carbide particles, the second elevated temperature may be about 1000° C. to about 1200° C. The controlled removal may be performed in a non-static manner, however, the non-static mode is not necessary to achieve the small, desired product particle size.

Controlled removal of carbon from the reaction product may be accomplished in a gas mixture comprising hydrogen, methane, carbon monoxide, carbon dioxide, water vapor, natural gas, or a combination of one or more of the foregoing gases. A hydrogen-containing atmosphere may contain about 99 to about 100 mole percent hydrogen, with the balance being methane, ethane, propane, or a similar hydrocarbon gas. The hydrocarbon gas to hydrogen ratio is selected at such a level that the free carbon can be removed, while the WC is kept at stoichoimetric carbon content (i.e., carbon content of the collected material is about 6.13 weight percent) without substantial decomposition, i.e., little or no $W_2C$ formation. In order to reach this goal, the carbon activity at the controlled removal step may be about 0.01 to about 0.99, or about 0.01 to about 0.50. At this carbon activity, the methane to hydrogen mole ratio, for example, is less than 0.02. The carbon activity ($\alpha_C$) is calculated according to the following equation:

$$a_C = \frac{p_{CH_4}}{P_{H_2}^2} e^{\frac{-\Delta G^o}{RT}} \tag{5}$$

where $P_{CH4}$ is the partial pressure of methane or other hydrocarbon gas, $P_{H2}$ is the partial pressure of hydrogen, $\Delta G^o$ is the change of standard Gibbs free energy of reaction (3), R is gas constant, and T is the temperature in Kelvins.

The carbon activity may be controlled, for example, by regulating the volume flow of the hydrogen and hydrocarbon gas. Also, a carbon monoxide/carbon dioxide gas mixture may be employed in addition to or in place of the hydrogen/hydrocarbon gas mixture. When a carbon monoxide/carbon dioxide gas mixture is used, however, the temperature may be less than or equal to about 900° C., preferably about 600° C. to about 800° C.

The tungsten carbide produced may have an oxygen content of less than or equal to about 0.5 wt %, more typically, less than or equal to about 0.3 wt %, and a free carbon content of less than or equal to about 0.1 wt %, more typically, less than or equal to about 0.05 wt %.

In another embodiment, an intermediate product comprises a partially carburized tungsten carbide and free carbon, wherein the amount of carbon is greater than 6.13 wt % in the intermediate product. In this embodiment, an atmosphere comprising hydrogen, methane, carbon monoxide, carbon dioxide, water vapor, natural gas, or a combination of one or more of the foregoing gases, may be employed at a second temperature. This reaction should be carried out under conditions sufficient to cause addition of carbon to the carbon deficient tungsten carbide in the intermediate mixture and to remove substantially all of the free carbon. The atmosphere may, for example, contain about 99 to about 100 mole percent hydrogen, with the balance being a methane, ethane, propane, or a similar hydrocarbon gas. The hydrocarbon gas to hydrogen ratio is selected at such a level that free carbon is removed, while the WC is formed at the stoichiometric carbon content. In this embodiment, the carbon activity of the gas mixture maybe about 0.01 to about 0.99, or about 0.01 to about 0.50.

In yet another embodiment, the intermediate product comprises a partially carburized tungsten carbide, wherein the amount of carbon is less than 6.13 wt % in the intermediate product. In this embodiment, an atmosphere comprising hydrogen, methane, carbon monoxide, carbon dioxide, water vapor, natural gas, or a combination of one or more of the foregoing gases, may be employed at a second temperature to adjust the carbon level in the product. This reaction should be carried out under conditions sufficient to cause addition of carbon to the carbon deficient tungsten carbide in the intermediate mixture. In this embodiment, the carbon activity of the gas mixture may be about 0.01 to about 0.99, or about 0.5 to about 0.99.

The method disclosed herein is further demonstrated by the following non-limiting examples.

EXAMPLES

Example 1

A mixture of tungsten oxide and carbon black was prepared with a carbon to tungsten oxide mole ratio of 4.05, by milling 333.33 g of $WO_3$ tungsten oxide, 72.0 g of carbon black with a surface area of 8.7 $mm^2/g$, both from Buffalo Tungsten Inc., Buffalo, N.Y., and 1000 g of water using WC-Co milling media having a diameter of 0.5 cm. The milling was performed in a stainless steel-lined mill with a height of 23 cm and diameter of 23 cm and half-filled with the milling media at a rate of approximately 400 rpm for 2 hours. The mill was emptied of its contents, cleaned, refilled with the contents, and operated for another 2 hours. The powder resulting from the milling operation was passed through a 60-mesh screen to remove the milling media.

The milled mixture of tungsten oxide and carbon was then spray-dried into a 40 μm to 60 μm powder with excellent flow ability. The dried 400 g mixture of $WO_3$ and C was placed into a 33-cm long and 5 cm diameter Incolloy crucible which was placed in an electrical furnace. The crucible was positioned horizontally in the furnace. The crucible was rotated at approximately 6 rpm, and the furnace was heated to 950° C. to cause the reaction to occur between the tungsten oxide and the carbon while flowing about 930 milliliters/minute nitrogen through the furnace. The atmosphere within the furnace was nitrogen at the onset of the reaction and, during the reaction, the atmosphere was nitrogen with a small partial pressure of carbon monoxide and carbon dioxide created by the reaction. The carbon monoxide in the mixture was burned by passing through a flame torch, to eliminate the environmental concerns of the toxicity. The temperature of the furnace was first increased about 10° C./minute to 900° C. and then increased about 5° C./minute to 950° C. The extent of the reaction was monitored by analyzing the total gas flow rate at the outside of the tube furnace. As the reaction occurred, the gas flow was quickly increased. After keeping a high flow rate about several minutes, the outgoing gas level decreased back to the nitrogen flow rate level at the start of the reaction (baseline level). The crucible was allowed to cool naturally. The reaction was essentially complete in about 60 minutes.

The cooled fully-carburized WC and free carbon intermediate product had a pure WC phase with a grain size 28 nm, determined using standard grain size test of the x-ray diffraction (XRD) pattern. Because the amount of free carbon was so small and carbon has a low atomic number, the XRD pattern showed pure WC peaks and small amount of graphite. Carbon content test results showed the carbon content was 12 wt %.

The fully carburized WC and free carbon mixture was first separated by air classification by blowing compressed air. The total carbon content was decreased to 6.27 wt %. Then an $H_2/CH_4$ mixed gas was used to remove free carbon according to reaction (6). The resulting carbon-adjusted mixture was heated to 950° C. for 1 hour in a 0.75% methane and 99.25% hydrogen atmosphere while rotating in an Incolloy crucible at 6 rpm. The carbon activity in the mixture was 0.5. 280 grams of the carbon-adjusted mixture were carburized at a time. During this free carbon removal step, essentially all of the free C was converted to $CH_4$, while the WC was kept at a stoichiometric composition. The resulting product was substantially pure WC having 6.13±0.04 wt % total carbon. The grain size was 28 nm as determined by x-ray diffraction and the particle size was approximately 80 μm in diameter as determined by the BET surface area.

Example 2

The experiment described in Example 1 was repeated except that the carbon to tungsten oxide ratio was 3.55 and the reaction temperature was 980° C., for 1 hour. At 980° C., a carbon to tungsten molar ratio of 3.55 is sufficient to produce fully carburized tungsten carbide, based on the thermodynamics of reaction (1). However, in this example, the reaction time was not long enough, and the intermediate product contained WC, $W_2C$, W, and C.

Figure 2:
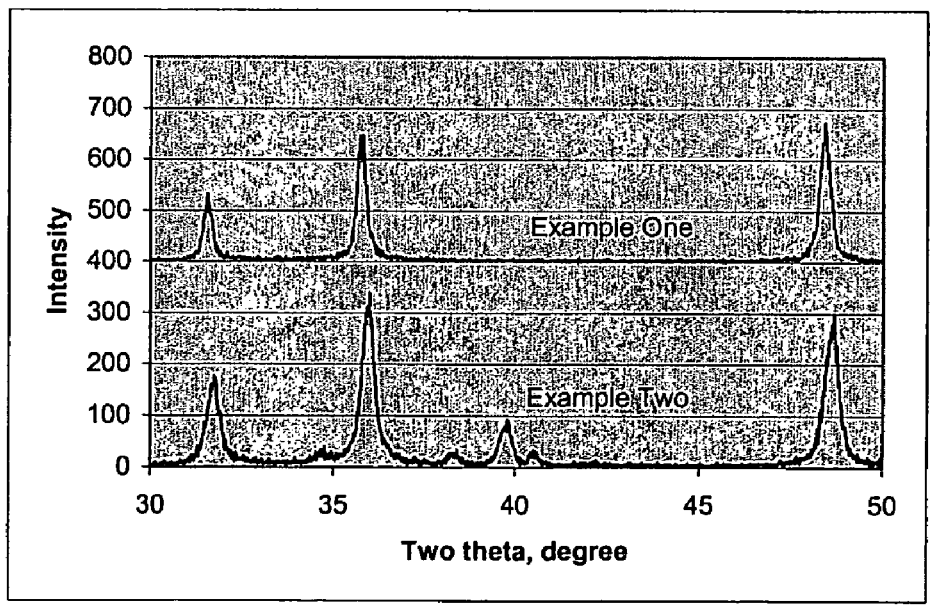
FIG. 2 shows a comparison of the x-ray diffraction patterns for example 1 and comparative example 1.

The cooled products had a total carbon content of 6.17 wt %, but the final products had $W_2C$ and W impurities. FIG. 2 shows a comparison of the x-ray diffraction patterns for Example 1 and Example 2. In order to remove the free carbon and to produce fully carburized tungsten carbide, a mixed gas of hydrogen and methane was used with a $CH_4/H_2$ mole ratio of 0.008 at 1000° C. for 1 hours. Grain size and particles size were not measured for Example 2.

Example 3

All of the conditions were the same as Example 1, except the carbon to tungsten molar ratio was 4.09 and the first step reaction temperature was 1100° C. After the first step reaction, the total carbon content of the intermediate product was 6.56 wt %. X-ray diffraction showed only WC and free carbon in the intermediate product. Using a mixture gas of hydrogen and natural gas with a ratio of natural gas to $H_2$ equal to 0.0033 at 1050° C. (carbon activity of 0.4) and a reaction time of 0.5 hour, the final WC with a total carbon content of 6.12 wt % and without $W_2C$ and W in the x-ray diffraction was produced.

Example 4

All the conditions were the same as Example 1, except the carbon to tungsten molar ratio was 4.18 and the first step reaction temperature was 1200° C. After the first step reaction, the total carbon content was 8.13 wt %, and only WC and free carbon were observed in the intermediate product. Using a mixture gas of hydrogen and natural gas with a ratio of methane to $H_2$ equal to 0.001 at 1125° C. (carbon activity of 0.21), the total carbon content in the final WC product was 6.10 wt %, with a grain size of 50 nm, and particle size of 300 nm.

Example 5

The experiment of Example 1 was repeated except that the carbon to tungsten oxide mole ratio was 3.67, the temperature of the furnace was maintained at 930° C. for 1 hour and 960° C. for 1 hour, and there was no air separation process. The grain size of the WC product was 35 nm and the particle size was 100 nm.

The fully carburized intermediate product of WC and carbon had a carbon content of 8.22 wt %. This mixture was first treated with pure hydrogen at 950° C. for 1 hour, followed by 0.75% methane and 99.25% hydrogen for another 1 hour to remove the free carbon (carbon activity of 0.6). The final WC product had a carbon content of 6.13±0.05 wt %. The WC grain size was about 38 nm and the particle size of 100 nm (0.1 μm).

Examples 6-8

The experiment of Example 1 was repeated except that the carbon to tungsten oxide molar ratio was 3.67, the temperature of the furnace was maintained at 980° C. to 1100° C. for 1 hour, and there was no air separation process.

The fully carburized intermediate product of WC and carbon had a carbon content of 7.46 wt %, 6.81 wt %, and 6.75 wt % for the first reaction temperatures of 1000° C., 1050° C., and 1100° C., respectively. This mixture was first treated with pure hydrogen first at 950° C. for 2 hours, followed by 0.75% methane and 99.25% hydrogen for another 1 hour to remove the free carbon (the carbon activity was zero using pure hydrogen, and 0.5 using the hydrogen and methane mixture). The final products had a total carbon content of 6.13±0.05 wt %. The WC grain sizes were about 38 nm, 40 nm, and 44 nm for the first step reaction temperatures of 1000° C., 1050° C., and 1100° C., respectively. All three products had particle sizes of 120 nm to 180 nm (0.12-0.18 μm).

Example 9

The experiment of Example 1 was repeated except that the carbon to tungsten oxide molar ratio was 3.80, and the temperature of the furnace was maintained at 1150° C. for 0.5 hour. The intermediate product was a partially carburized product comprising WC, $W_2C$, and W. The total carbon content was 5.95 wt %. This mixture was first treated with hydrogen and methane at 1000° C. for 1 hour with a $CH_4/H_2$ ratio of 0.007 (carbon activity of 0.80). The total carbon content of the final WC product was 6.08 wt %. The WC grain size was about 38 nm and the particle size was 200 nm (0.2 μm).

Example 10

A total of about 100 lbs of yellow oxide $WO_3$ and carbon black were mixed in a ratio of 3.67 wt % with water. This mixture was then spray dried to obtain a preceramic powder. The carburization experiments were then carried out in a commercial 2 foot diameter rotary furnace. In this furnace, the preheating zone was 1.64 feet (0.5 m), the heating zone was 9.84 feet (3.0 m), and the cooling zone was 4.92 feet (1.5 m). The raw material was fed into the furnace in the preheating zone and gradually moved to the reaction zone (or heating zone), passed the cooling zone, finally to the powder collector. The carrier gas entered into the furnace from cooling zone and moved out at preheating zone (opposite to the powder moving direction). The rotary furnace has two controlled plate valves in the discharge pipe that seal the furnace and protect the powder from oxidation. Operation conditions of the furnace were:

Reaction temperature: 1050° C. (setting point)
$N_2$ gas (carrier gas) flow rate: 18.7 $Nm^3/h$
Preceramic powder feed rate: 39.6 kg/h (setting point)
Furnace slope: 1° C.
Rotation speed: 3 RPM The resultant powder was in a carbon deficient state. The next step was refeeding the powder into this furnace under a $H_2/CH_4$ gas mixture at a carbon activity of about 0.9 to obtain a fully carburized superfine WC powder.

The obtained superfine WC powder had a submicrometer particle size of about 0.2 micrometers to about 0.4 micrometers. The powder properties are shown in Table 1.

TABLE 1

| Superfine WC powder properties | |
|---|---|
| Particle size (SEM) micrometer | 0.25 |
| Total Carbon, % | 6.10 |
| Free Carbon, % | <0.1 |
| Phase (XRD) | WC |

Scanning electron microscopy (SEM) analysis indicated that the obtained WC powder is agglomerated submicrometer sized particles, with particle sizes of about 0.25 micrometers to about 0.4 micrometers (data not shown). X-ray powder diffraction analysis revealed this superfine powder to be a single WC phase, with no eta-phase or $W_2C$ observed (data not shown). Grain size calculation using XRD broadening revealed that this superfine WC had a grain size of about 0.05 micrometers to about 0.1 micrometer.

The superfine WC powder was further processed into a bulk form using a liquid phase sintering technique. Prior to sintering, additives were added, including 10 wt % Co, 0.5 wt % $Cr_2O_3$, and 0.5 wt % VC. The mixture was ball milled for 48 hours in hexane. The ball milled powder was then pressed into bars. The pressed bars were vacuum sintered at 1,410° C. for 90 minutes. The obtained material was fully sintered into a bulk WC/10Co ingot. The ingots were further characterized using a variety of available tools, including saturation magnetization, coercivity, Rockwell hardness, sintered density, porosity, WC grain size, rupture strength, as shown in Table 2.

TABLE 2

| Sintered Bulk Properties (WC/10Co) | |
|---|---|
| Coercivity Hc (kA/m) | 26.7 |
| Saturation Magnetization Ms (%) | 90.79 |
| Hardness Rockwell A (HRA) | 92.7 |
| Density (g/cm$^3$) | 14.32 |
| Rupture Strength (N/mm$^2$) | 3380 |
| Porosity type | A02B00C00 |
| WC grain size (μm) | 0.48 |

Methods of forming monometal carbides have been described. In one method, a reaction product comprising fully carburized monometal carbide and excess carbon is formed. One advantage of the method is that all of the tungsten may be converted to WC in the first step. In this embodiment, using a carbon to metal ratio higher than the thermodynamic ratio (e.g., according to FIG. 1) allows for faster and more complete reaction than previously described methods. In addition, previous methods employed formation of a partially carburized metal carbide followed by carbon addition at high temperature. This high temperature step causes grain growth, thus nanometer and superfine products are difficult to produce. The low temperature (e.g., 900° C. to 1100° C.) two step process described herein allows for the formation of nanometer and superfine products. Another advantage is that the excess carbon in the reaction product may act as a dispersant and aid in preventing particle agglomeration. Yet another advantage, is that carbon removal may be achieved under conditions of controlled carbon activity which allows for faster carbon removal at a given temperature.

In another method, an intermediate product comprises partially carburized metal carbide and free carbon with total carbon content greater than the stoichiometric value of 6.13 wt %. A second step may then be employed to fully carburize the monometal carbide and to remove the free carbon as well, using controlled carbon activity. This method is particularly suitable when the chemical dynamics for formation of the intermediate product are not sufficient to produce fully carburized monometal carbide. That is, even if the intermediate product does not comprise fully carburized monometal carbide, a monometal carbide with a stoichiometric composition can be produced through accurate control of the second step reaction.

In yet another embodiment, the intermediate product may have a total carbon deficit, i.e., the total carbon content is less than the theoretical carbon content (6.13 wt % for WC). In the case of tungsten carbide, the intermediate products in this embodiment may be W$_2$C, WC, and W. Controlled carbon activity may be employed to convert this intermediate product to fully carburized WC. One advantage in this embodiment comes from the second step, i.e., using hydrogen and a carbon containing mixed gas to add carbon to the intermediate product at low temperature, such as 900° C. In this method, the final grain size and particle size may be smaller than those produced in prior art methods, particularly those in which carbon was added to the carbon deficient intermediate products using solid carbon in a high temperature reaction (e.g., greater than about 1300° C.). The higher temperature of the second step resulted in a coarse metal carbide because of particle agglomeration, as taught by U.S. Pat. No. 4,664,899, in which a temperature of 1400° C. is employed.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of making a tungsten carbide powder, comprising:
    ball milling a reaction mixture comprising a tungsten source and a solid carbon source;
    heating a reaction mixture at a first temperature of about 900° C. to 950° C. in a non-reducing atmosphere to form a reaction product comprising fully carburized tungsten carbide and an excess of free solid carbon; wherein the reaction product has a total carbon content of greater than 6.13 wt %; and
    removing the excess carbon from the reaction product using a controlled removal process to form a tungsten carbide powder having a carbon content of about 6.08 wt % to about 6.16 wt %;
    wherein a molar ratio of carbon to tungsten in the reaction mixture is greater than or equal to about 3.45 and
    wherein the controlled removal process is performed at a temperature of about 600° C. to about 1200° C.

2. The method of claim 1, wherein the molar ratio of carbon to tungsten in the reaction mixture is greater than or equal to about 4.0.

3. The method of claim 1, wherein the tungsten source is yellow tungsten oxide, blue tungsten oxide, ammonium metatungstate, ammonium paratungstate, or a combination comprising one or more of the foregoing tungsten sources.

4. The method of claim 1, wherein the solid carbon source is carbon black, lampblack, acetylene black, glucose, or a combination comprising one or more of the foregoing carbon sources.

5. The method of claim 1, wherein the reaction mixture subjected to the ball milling further comprises a solvent to form a slurry, and further comprising spray drying the slurry prior to heating the reaction mixture.

6. The method of claim 1, wherein heating, removing, or both is done in a rotary furnace.

7. The method of claim 1, wherein the controlled removal process is performed at a second temperature with a gas mixture having a carbon activity of about 0.01 to 0.99.

8. The method of claim 7, wherein the gas mixture comprises hydrogen, methane, carbon monoxide, carbon dioxide, water vapor, natural gas, or a combination of one or more of the foregoing gases.

9. The method of claim 8, wherein the gas mixture comprises hydrogen and methane.

10. The method of claim 1, wherein the controlled removal process comprises a physical method.

11. The method of claim 10, wherein the physical method is a gas separation process, a liquid separation method, or a combination thereof.

12. The method of claim 1, wherein the tungsten carbide powder is a nanosized or superfine powder.

13. A method of making a tungsten carbide powder, comprising:
    ball milling a reaction mixture comprising a tungsten source and a solid carbon source;
    heating the reaction mixture at a first temperature of about 900° C. to 950° C. in a non-reducing atmosphere to form a reaction product comprising fully carburized tungsten carbide and an excess of free solid carbon; wherein a molar ratio of carbon to tungsten in the reaction mixture is greater than or equal to about 3.45 and wherein the reaction product has a total carbon content of greater than 6.13 wt %; and removing the excess carbon from the reaction product using a controlled chemical removal process to form a tungsten carbide powder having a carbon content of about 6.08 wt % to about 6.16 wt %, wherein the controlled chemical removal process comprises heating the reaction product at temperature about 800° C. to about 1200° C. in a gas mixture having a carbon activity of about 0.01 to 0.99, wherein the gas mixture comprises hydrogen and methane.

14. A method of making a tungsten carbide powder, comprising:

ball milling a reaction mixture comprising a solid tungsten source and a solid carbon source;

heating the reaction mixture in a non-reducing atmosphere at a first temperature of about 900° C. to about 950° C. to form an intermediate product comprising a partially carburized tungsten carbide and free solid carbon, wherein the intermediate product has a carbon content of greater than 6.13 wt %; and adjusting the carbon content of the partially carburized tungsten carbide to form a fully carburized tungsten carbide powder having a carbon content of about 6.08 wt % to about 6.16 wt %;

wherein adjusting comprises heating at a second temperature in the presence of a gas mixture having a carbon activity of about 0.01 to about 0.99 at a temperature of about 600° C. to about 1200° C.

15. A method of making a tungsten carbide powder, comprising:

ball milling a reaction mixture comprising a sold tungsten source and a solid carbon source;

heating the reaction mixture in a non-reducing atmosphere at a first temperature of about 900° C. to 950° C. to form an intermediate product comprising a partially carburized tungsten carbide, wherein the intermediate product has a carbon content of less than 6.13 wt %; and adjusting the carbon content of the partially carburized tungsten carbide to form a tungsten carbide powder having a carbon content of about 6.08 wt % to about 6.16 wt %;

wherein adjusting comprises heating at a second temperature in the presence of a gas mixture having a carbon activity of about 0.5 to about 0.99.

16. The method of claim 15, wherein the second temperature is about 600° C. to about 1200° C.

17. The method of claim 15, wherein the solid tungsten source comprises ammonium metatungstate.

18. The method of claim 15, wherein the gas mixture comprises hydrogen, methane, carbon monoxide, carbon dioxide, water vapor, natural gas, or a combination of one or more of the foregoing gases.

19. The method of claim 18, wherein the gas mixture comprises hydrogen and methane.

* * * * *

UNITED STATES PATENT AND TRADEMARK OFFICE
CERTIFICATE OF CORRECTION

PATENT NO. : 7,625,542 B2
APPLICATION NO. : 10/831047
DATED : December 1, 2009
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Second Day of November, 2010

David J. Kappos
*Director of the United States Patent and Trademark Office*